(12) United States Patent
Saxena et al.

(10) Patent No.: US 11,080,562 B1
(45) Date of Patent: Aug. 3, 2021

(54) KEY POINT RECOGNITION WITH UNCERTAINTY MEASUREMENT

(71) Applicants: Shreyas Saxena, Mountain View, CA (US); Wenda Wang, Mountain View, CA (US); Guanhang Wu, Santa Clara, CA (US); Nitish Srivastava, San Francisco, CA (US); Dimitrios Kottas, Sunnyvale, CA (US); Cuneyt Oncel Tuzel, Cupertino, CA (US); Luciano Spinello, Sunnyvale, CA (US); Ricardo da Silveira Cabral, Zurich (CH)

(72) Inventors: Shreyas Saxena, Mountain View, CA (US); Wenda Wang, Mountain View, CA (US); Guanhang Wu, Santa Clara, CA (US); Nitish Srivastava, San Francisco, CA (US); Dimitrios Kottas, Sunnyvale, CA (US); Cuneyt Oncel Tuzel, Cupertino, CA (US); Luciano Spinello, Sunnyvale, CA (US); Ricardo da Silveira Cabral, Zurich (CH)

(73) Assignee: Apple Inc., Cupertino, CA (US)

( * ) Notice: Subject to any disclaimer, the term of this patent is extended or adjusted under 35 U.S.C. 154(b) by 60 days.

(21) Appl. No.: 16/441,167

(22) Filed: Jun. 14, 2019

Related U.S. Application Data

(60) Provisional application No. 62/738,412, filed on Sep. 28, 2018, provisional application No. 62/685,566, filed on Jun. 15, 2018.

(51) Int. Cl.
*G06K 9/00* (2006.01)
*G06K 9/62* (2006.01)
*G06T 7/246* (2017.01)
*G06T 7/73* (2017.01)

(52) U.S. Cl.
CPC ......... *G06K 9/6262* (2013.01); *G06K 9/6256* (2013.01); *G06T 7/246* (2017.01); *G06T 7/73* (2017.01); *G06T 2207/20081* (2013.01); *G06T 2207/30252* (2013.01)

(58) Field of Classification Search
CPC .................................................. G06K 9/6262
See application file for complete search history.

(56) References Cited

U.S. PATENT DOCUMENTS

| 5,790,403 | A | 8/1998 | Nakayama |
| 7,202,776 | B2 | 4/2007 | Breed |
| 9,886,771 | B1 * | 2/2018 | Chen .................... G06F 3/04845 |
| 10,706,321 | B1 * | 7/2020 | Chen .................... G06T 3/4007 |
| 2014/0336848 | A1 | 11/2014 | Saund et al. |
| 2018/0137642 | A1 | 5/2018 | Malisiewicz et al. |

(Continued)

*Primary Examiner* — Oneal R Mistry
(74) *Attorney, Agent, or Firm* — Young Basile Hanlon & MacFarlane, P.C.

(57) ABSTRACT

A method includes obtaining training samples that include images that depict objects and annotations of annotated key point locations for the objects. The method also includes training a machine learning model to determine estimated key point locations for the objects and key point uncertainty values for the estimated key point locations by minimizing a loss function that is based in part on a key point localization loss value that represents a difference between the annotated key point locations and the estimated key point locations values and is weighted by the key point uncertainty values.

25 Claims, 5 Drawing Sheets

(56) References Cited

U.S. PATENT DOCUMENTS

2019/0147341 A1* 5/2019 Rabinovich .......... G06N 3/0481
                                                   382/156
2020/0042769 A1* 2/2020 Yan ..................... G06K 9/6262

* cited by examiner

KEY POINT RECOGNITION WITH UNCERTAINTY MEASUREMENT

CROSS-REFERENCE TO RELATED APPLICATIONS

This application claims the benefit of U.S. Provisional Application No. 62/685,566, filed on Jun. 15, 2018. This application also claims the benefit of U.S. Provisional Application No. 62/738,412, filed on Sep. 28, 2018. The contents of the foregoing applications are incorporated herein by reference in their entireties for all purposes.

TECHNICAL FIELD

This disclosure relates to systems and methods for identifying features in images.

BACKGROUND

Object detection systems are known that identify features in images. As an example, a trained machine learning system can be configured to identify features in images. Under certain conditions, the accuracy of these systems may be low.

SUMMARY

Systems and methods for key point recognition with uncertainty measurement are described herein.

One aspect of the disclosure is a method that includes obtaining training samples that include images that depict objects and annotated key point locations for the objects. The method also includes training a machine learning model to determine estimated key point locations for the objects and key point uncertainty values for the estimated key point locations. Training the machine learning model is performed by minimizing a loss function that is based in part on a key point localization loss value that represents a difference between the annotated key point locations and the estimated key point locations values and is weighted by the key point uncertainty values.

The annotated key point locations may correspond to features on the objects. The features may be predetermined features. The annotated key point locations and the estimated key point locations may be expressed as two-dimensional coordinates relative to the images.

The key point uncertainty values may represent accuracy levels associated with each of the estimated key point locations. The key point uncertainty values may describe uncertainty with respect to a first spatial direction relative to the images and with respect to a second spatial direction relative to the images for each of the estimated key point locations. Each of the key point uncertainty values may include a first standard deviation value for the first spatial direction of the images and a second standard deviation value for the second spatial direction of the images.

Another aspect of the disclosure is a method that includes obtaining a series of images that depict an object having a key point. For each image from the series of images, the method includes determining, based on the image, an estimated key point location for the key point. The method also includes determining, based on the image, an uncertainty value that represents accuracy of the estimated key point location, and updating a filtered key point location estimate based on the estimated key point location and the uncertainty value. The method also includes controlling operation of an automated system based in part on the filtered key point location estimate.

The key point may correspond to a feature on the object. The feature may be a predetermined feature. The estimated key point location may be expressed as two-dimensional coordinates relative to the image. The uncertainty value may represent an accuracy level associated with the estimated key point location. The uncertainty value may describe uncertainty with respect to a first spatial direction relative to the image and with respect to a second spatial direction relative to the image for the estimated key point location. The uncertainty value may include a first standard deviation value for the first spatial direction of the image and a second standard deviation value for the second spatial direction of the image.

In some implementations, controlling operation of an automated system based in part on the filtered key point location estimate includes determining a position and orientation for the object based on the filtered key point location estimate.

In some implementations, determining the estimated key point location and determining the uncertainty value is performed using a trained machine learning model that is trained by minimizing a loss function that is based on a key point localization loss value that is weighted based on uncertainty.

Another aspect of the disclosure is a system that includes a sensor that is configured to obtain a series of images that depict an object having a key point. The system also includes an image analyzer that is configured to determine, for each image from the series of images, an estimated key point location for the key point, and an uncertainty value that represents accuracy of the estimated key point location. The system also includes an object tracker that is configured to updating a filtered key point location estimate based on the estimated key point location and the uncertainty value and determine a position and orientation for the object based on the filtered key point location estimate.

The key point may correspond to a feature on the object. The feature may be a predetermined feature. The estimated key point location may be expressed as two-dimensional coordinates relative to the image. The uncertainty value may represent an accuracy level associated with the estimated key point location. The uncertainty value may describe uncertainty with respect to a first spatial direction relative to the image and with respect to a second spatial direction relative to the image for the estimated key point location. The uncertainty value may include a first standard deviation value for the first spatial direction of the image and a second standard deviation value for the second spatial direction of the image.

In some implementations, the image analyzer includes a trained machine learning model that is trained by minimizing a loss function that is based on a key point localization loss value that is weighted based on uncertainty.

DETAILED DESCRIPTION

Figure 1:
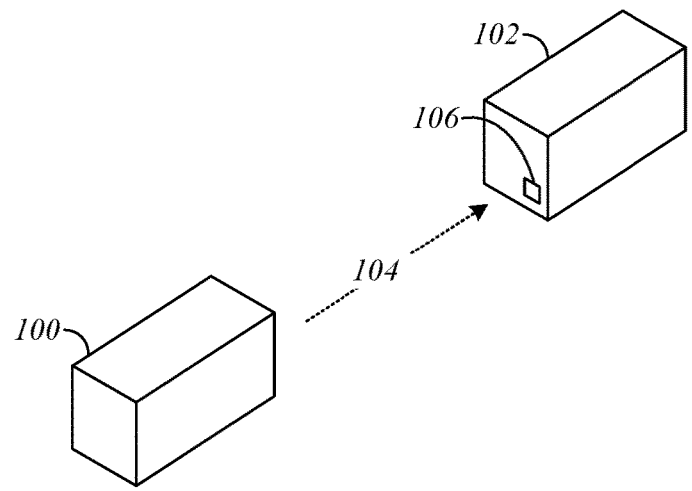
FIG. 1 is an illustration that shows an example of a scenario in which key point estimation can be used.

The systems and methods that are described herein measure key points on an object while concurrently determining uncertainty values. Key points are discrete locations that correspond to specific features on the object that can be identified to measure the object, locate the object in an environment, and/or classify the object. Key point locations can be used to locate the position, orientation, and extents of an object in three-dimensional space. The uncertainty values describe whether the estimated location for a key point is believed to be accurate and may be in the form of a metric that describes an accuracy level for a respective key point location estimate. For example, the uncertainty values may define a spatial area in which the annotated location of the key point is likely to be found, such that the believed accuracy of the key point location is high when the uncertainty values define a small spatial area and the believed accuracy of the key point location is low when the uncertainty values define a large spatial area. As will be explained herein, the uncertainty values allow for more accurate and robust position estimation.

One application for key point detection is locating the position, orientation, and extents of vehicles in three-dimensional space, and this information can be used, for example, in the context of an autonomous vehicle, the provide an automated control system of the vehicle with information that can be used to understand the locations of other vehicles and track those locations over time. In the example use case of vehicle detection, key points may include the wheels, headlights, tail lights, and side mirrors of a vehicle. Key points for vehicles may also include the points at which each of the tires of the vehicle contacts an underlying surface, such as a road.

Key point detection can be utilized in many different applications in addition to vehicle detection applications. Generally, key point detection can be applied to implementing a tracker for any kind of object that includes discrete features that can be localized and measured and for which their location can be described in terms of a single point in three-dimensional space, as opposed to a two-dimensional or three-dimensional bounding box. For example, a person can be tracked using key points that represent approximate center locations for the person's feet.

Key points can be utilized in various ways by object tracking systems. In some implementations, two or more key points may be defined on an object such that the key points have a known geometric relationship with respect to one another, such as a known distance relationship and/or a known angular relationship, and a known positional relationship with respect to the object. As an example, a positional relationship of key points relative of an object can be established based on one or more axes defined by the object, such as an elevational axis (e.g., an axis in a generally upright direction or vertical direction), a longitudinal axis (e.g., an axis in a direction corresponding to a longest dimension of the object and generally perpendicular to the elevational axis), and a lateral axis (e.g., an axis corresponding to a width direction that is generally perpendicular to the elevational axis and is generally perpendicular to the longitudinal axis).

The locations of two or more key points that have a known positional relationship with respect to each other can be used to estimate the angular orientation of an object, such as a yaw angle, a pitch angle, or a roll angle for the object. As one example, the locations of two key points having a known positional relationship to each other and a known positional relationship to the object may be used to determine the yaw angle, the pitch angle, or the roll angle for the object, and additional key points can be used to increase the accuracy of the estimation.

In some situations, key point location estimates may be inaccurate. In this context, the term "inaccurate" means that the estimated location of the key point does not correspond to the annotated location of the feature of interest in the image that is being analyzed. For example, occlusion of the features in an image may cause a key point detection system to generate inaccurate estimates of key point location.

By determining an uncertainty value for the key point measurements and providing this information to the automated system that is using the key points, the automated system can adjust its usage of the key points based on the uncertainty value. As an example, the system can ignore key point measurements that have high uncertainty values or filter the key point measurements over time using the uncertainty values (e.g., position estimates are updated in a manner that is weighted according to the uncertainty values).

In an example implementation in which an object tracker is configured to determine the positions and orientations of vehicles using key points, the key points may represent the locations at which the tires of the vehicle contact a road. The key point locations are estimated using inputs from sensors, such as video frames from a video camera. In the video frames, one or more of the key point locations may be occluded. As a result, the uncertainty values that are determined for these key point locations may be high. Based on the uncertainty values, these key point locations may be disregarded by the object tracker when estimating the position and orientation for the object, and the position and orientation estimates may be determined based on the remaining key point locations or may be supplemented using locations of other key points.

FIG. 1 is an illustration that shows a first vehicle 100 and a second vehicle 102 and is an example of a scenario in which key point detection can be used. The first vehicle 100 is an example of a mobile apparatus that can incorporate object detection capabilities. The second vehicle 102 is an example of an object that can be detected. It should be understood, however, that the systems and methods that are described herein are applicable to control applications and detection applications other than vehicle control and detection.

The first vehicle 100 includes sensor systems that obtain sensor information 104 that is output in the form of signals that can be used to detect objects, such as the second vehicle 102. The sensor information 104 can be interpreted to detect objects and other features, such as by using known machine vision techniques and feature recognition methods and algorithms. Information describing detected objects and features can be used by real-time control systems, such as an autonomous driving system that is included in the first vehicle 100 and is operable to make control decisions and, using the control decisions, operate some or all actuator systems of the first vehicle 100, either without human control, or in cooperation with human control of other actuator systems.

The sensor information 104 that is obtained by the first vehicle 100 can include two-dimensional sensor outputs and three-dimensional sensor outputs. As an example, the two-dimensional sensor outputs can be images from a still camera or a video camera that obtains visible spectrum images or infrared spectrum images. As an example, the three-dimensional sensor outputs can be three-dimensional point clouds obtained from a lidar sensor, a structured-light-stereo sensor, or any other suitable three-dimensional sensing system.

The object being detected by the first vehicle 100, which in this case is the second vehicle 102, includes one or more features 106 that are useful for object detection and position determination. The features 106 are discrete physical features of objects that can be identified and located using machine-vision techniques. Typically, the features 106 correspond to features that are small relative to the size of the object, and multiple key points are located on a single object, making key points useful for size and orientation estimation.

As an example, and as will be explained further herein, the features 106 can be identified and located using a trained machine-learning system. As one example, a trained machine-learning system may be implemented using a deep neural network that has been trained to recognize and locate the features 106 in images using a large number of training samples (e.g., images showing objects that include the features) in conjunction with annotations that identify the locations of the features 106. In examples where the objects that are vehicles, the features 106 may include the wheels, headlights, tail lights, and side mirrors of a vehicle.

Figure 2:
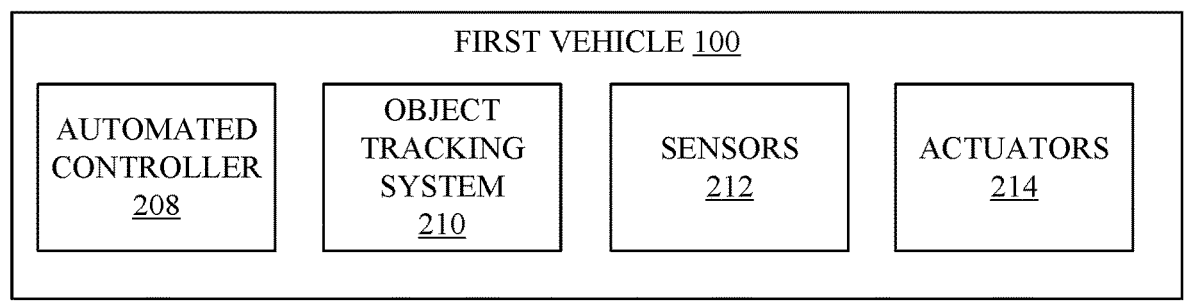
FIG. 2 is a block diagram of a first vehicle.

FIG. 2 is a block diagram of the first vehicle 100. The first vehicle 100 includes an automated controller 208, an object tracking system 210, sensors 212, and actuators 214.

The automated controller 208 is a system that makes control decisions for the first vehicle 100 based on inputs. The automated controller 208 may be implemented in the form of software that is executed by a computing device including any or all of a circuit, a processor, and a memory device.

The object tracking system 210 is a system that is configured to determine and track the positions and orientations of objects near the first vehicle 100. The object tracking system 210 will be explained further herein.

The sensors 212 can include cameras, radar sensors, lidar sensors, and other types of sensors. The outputs of the sensors 212 can be used by the object tracking system 210 for real-time sensing applications and/or can be stored for later use. When stored for later use, sensor outputs from the sensors 212 can be associated with timestamps that indicate the moment in time at which the information was perceived by the sensors 212. The timestamps can be coordinated across different types of sensors to allow different types of sensor outputs to be compared and used jointly during subsequent processing.

The actuators 214 are devices that cause and control motion of the first vehicle 100, such as suspension actuators, steering actuators, braking actuators, and propulsion actuators. The automated controller 208 is operable to control motion of the first vehicle 100 by outputting commands to the actuators 214. As an example, the automated controller 208 may receive or determine information that describes a trajectory between a starting location and a destination location. The automated controller 208 may determine, using information from the object tracking system 210, whether an object is present along the trajectory between the starting location and the ending location. If no object is present along the trajectory between the starting location and the ending location, the automated controller 208 may output commands that cause the actuators 214 to cause motion toward the ending location by following the trajectory. If an object is present along the trajectory between the starting location and the ending location, the automated controller 208 may output commands that cause the actuators 214 to deviate from the trajectory by avoiding contact with the object.

Figure 3:
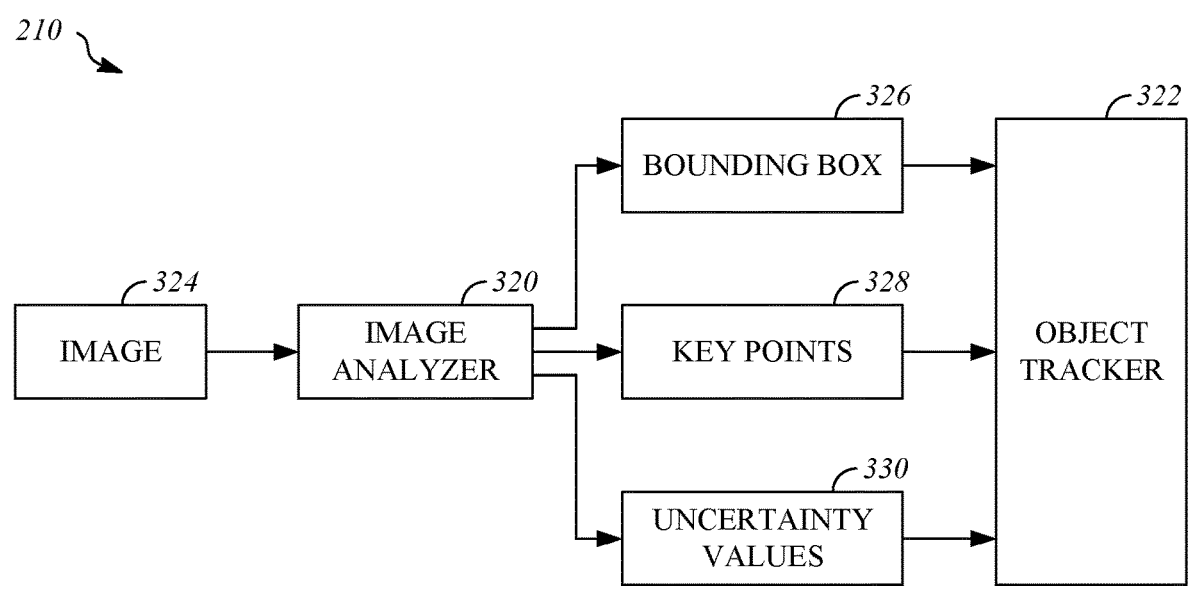
FIG. 3 is a block diagram that shows an object tracking system that includes an image analyzer and an object tracker.

FIG. 3 is a block diagram that shows the object tracking system 210, which includes an image analyzer 320 and an object tracker 322. As will be explained herein, the image analyzer 320 is operable to identify the presence of an object in an image, estimate the location key points for the object, and estimate an uncertainty value for each key point location. The uncertainty value for each key point location represents a likelihood that the key point is located at the estimated position. The output of the image analyzer 320 can be utilized by the object tracker 322, which is an automated system that is operable to identify and track objects (e.g., in terms of position an orientation). The information that is generated by the object tracker 322 can describe the position and orientation of objects in the images analyzed by the image analyzer 320. The object tracker 322 can provide this information to an automated system, such as the automated controller 208 of the first vehicle 100, for use in making control decisions.

The image analyzer 320 may be implemented using a machine learning system that has been trained to perform image analysis functions, as will be explained further herein. In one implementation, the image analyzer 320 can be implemented using a trained convolution neural network. The image analysis functions that are performed by the image analyzer 320 include object identification, feature identification, and uncertainty measurement.

The image analyzer 320 receives an image 324 as an input. The image 324 can be a raster image that is obtained by a camera or other image acquisition device (either visible spectrum or infrared spectrum). In operation, the image analyzer 320 can receive a series of the images as inputs and process them continuously as they are received. For example, images can be processed one-at-a-time in the order that they are received.

The image analyzer 320 is operable to generate outputs that include bounding boxes 326, key points 328, and uncertainty values 330.

One or more of the bounding boxes 326 may be defined by the image analyzer 320. The bounding boxes correspond to objects and surround the objects. As an example, the bounding boxes 326 may each surround a visual hull of a respective one of the objects that are visible in the image 324 that is being analyzed by the image analyzer 320. In some implementations the image analyzer determines a probability value for each of the bounding boxes 326. The probability value represents a likelihood that a respective one of the bounding boxes 326 accurately represents the identity and location of an object in the image 324.

The key points 328 are locations that correspond to predetermined types of features of the objects that are present in the image 324. Each of the key points 328 can be expressed as a pair of two-dimensional (e.g., x and y) coordinates relative to the image 324. The features identified by the image analyzer 320 using the key points 328 may be, for example, the features 106 of the second vehicle 102.

The uncertainty values 330 represent, for each of the key points 328, an uncertainty metric that describes whether the estimated location for the respective one of the key points 328 is believed to be accurate. For each of the key points 328, the respective one of the uncertainty values 330 is modeled as a standard deviation of the key point measurement. The standard deviation for each key point measurement is estimated with respect to each of the x axis of the image 324 and with the y axis of the image 324. The uncertainty values 330 can be visualized as an ellipse that is constructed according to the x and y values of the standard deviation of the measurement of the key points 328 and is centered at the estimated location of the respective one of the key points 328.

The bounding boxes 326, the locations of key points 328 and the uncertainty values 330 are directly output by the image analyzer 320, which may be, for example, a trained neural network.

The object tracker 322 utilizes the bounding boxes 326, the key points 328, and the uncertainty values 330 to track objects. It should be understood, however, that other inputs may be utilized by the object tracker 322 in combination with the bounding boxes 326, the key points 328, and the uncertainty values 330 to track objects. Tracking objects may include updating the position and orientation (i.e., pose) of the objects over time. For example, the image 324 may be a video frame and the object positions and orientations may be updated once for every video frame.

The object tracker 322 may utilize a fixed lag smoother to update filtered location estimates for the key points 328 and to update position and orientation estimates for the object based on the key points 328 and the uncertainty values. For example, for each new pair of values (key point location and corresponding uncertainty value), the object tracker 322 may update the filtered key point location estimate, the position estimate, and/or the orientation estimate for the object in a manner that is weighted dependent upon the uncertainty value.

The image analyzer 320 may be implemented using a trained neural network. Training samples may be provided that include annotated samples that correspond to the bounding boxes 326 and the key points 328. No explicit training information is provided to the image analyzer regarding the uncertainty values 330. Instead, the image analyzer 320 learns to predict the uncertainty values based on the content of the training images and the resulting key points 328. For example, the image analyzer may learn to associate occlusion of features with high levels of uncertainty.

The uncertainty values 330 may be treated as aleatoric uncertainty, which can be modeled by predicting input dependent variance. The aleatoric uncertainty can be learned by maximizing the log-likelihood loss, instead of regression loss, on targets.

Since the image analyzer 320 is trained to concurrently determine the bounding boxes 326, the key points 328, and the uncertainty values 330, training the image analyzer 320 may include minimizing a joint loss function that represents a loss associated with the bounding boxes 326, the key points 328, and the uncertainty values 330.

The loss function used to train the image analyzer 320 may output a loss value that is based on a bounding box classification loss L1, a bounding box localization loss L2, and a key point localization likelihood loss L3. As an example, the loss function used to train the image analyzer 320 may output a total loss value that is a sum of the bounding box classification loss L1, the bounding box localization loss L2, and the key point localization likelihood loss L3. Training of the neural network that is used to implement the image analyzer 320 seeks to minimize the total loss value.

Examples by which the bounding box classification loss L1, the bounding box localization loss L2, and the key point localization likelihood loss L3 can be calculated are described below in Equations 1-3. The following equations include the following terms: an input image $x_i$; a key point regression ground truth $y_i$; a bounding box classification label $y^{class}$; a bounding box regression ground truth t; a bounding box classification probability $\log(f_p(x_i)_k)$; a bounding box regression output $f_z(x_j)$; a two-dimensional key point output $f_\mu(x_i)$; and a two-dimensional key point uncertainty $f_\sigma(x_i)$.

The bounding box classification loss L1 may be determined in the manner shown below in Equation 1, based on the bounding box classification probability $\log(f_p(x_i)_k)$ for each of the bounding box classification labels $y^{class}$.

$$L1 = -\sum_k y_k^{class} \log(f_p(x_i)_k) \quad (1)$$

The bounding box localization loss L2 may be determined in the manner shown below in Equation 2 as a difference between the location of a ground truth bounding box t and the bounding box regression output $f_z(x_i)$.

$$L2 = \|t - f_z(x_i)\| \quad (2)$$

The key point localization likelihood loss L3 may be determined in the manner shown below in Equation 3 based on the two-dimensional key point output $f_\mu(x_i)$, the key point regression ground truth $y_i$, and the two-dimensional key point uncertainty $f_\sigma(x_i)$.

$$L3 = \|f_\mu(x_i) - y_i\| f_\sigma(x_i)^{-2} + \log f_\sigma(x_i)^2 \quad (3)$$

The key point localization likelihood loss combines the key point location and the uncertainty estimate to determine the loss during training. The key point localization likelihood loss is configured to maximize the log likelihood of the probability of the key point. As a result, the loss is weighted by the uncertainty value, and the neural network (or other machine learning model) that is used to implement the image analyzer 320 automatically learns when it should output a low standard deviation value or a low standard deviation value. For example, when the estimated location of the key point is close to the location of the corresponding feature from the object (e.g., according to the ground truth), the two-dimensional key point uncertainty $f_\sigma(x_i)$ should be low.

Figure 4:
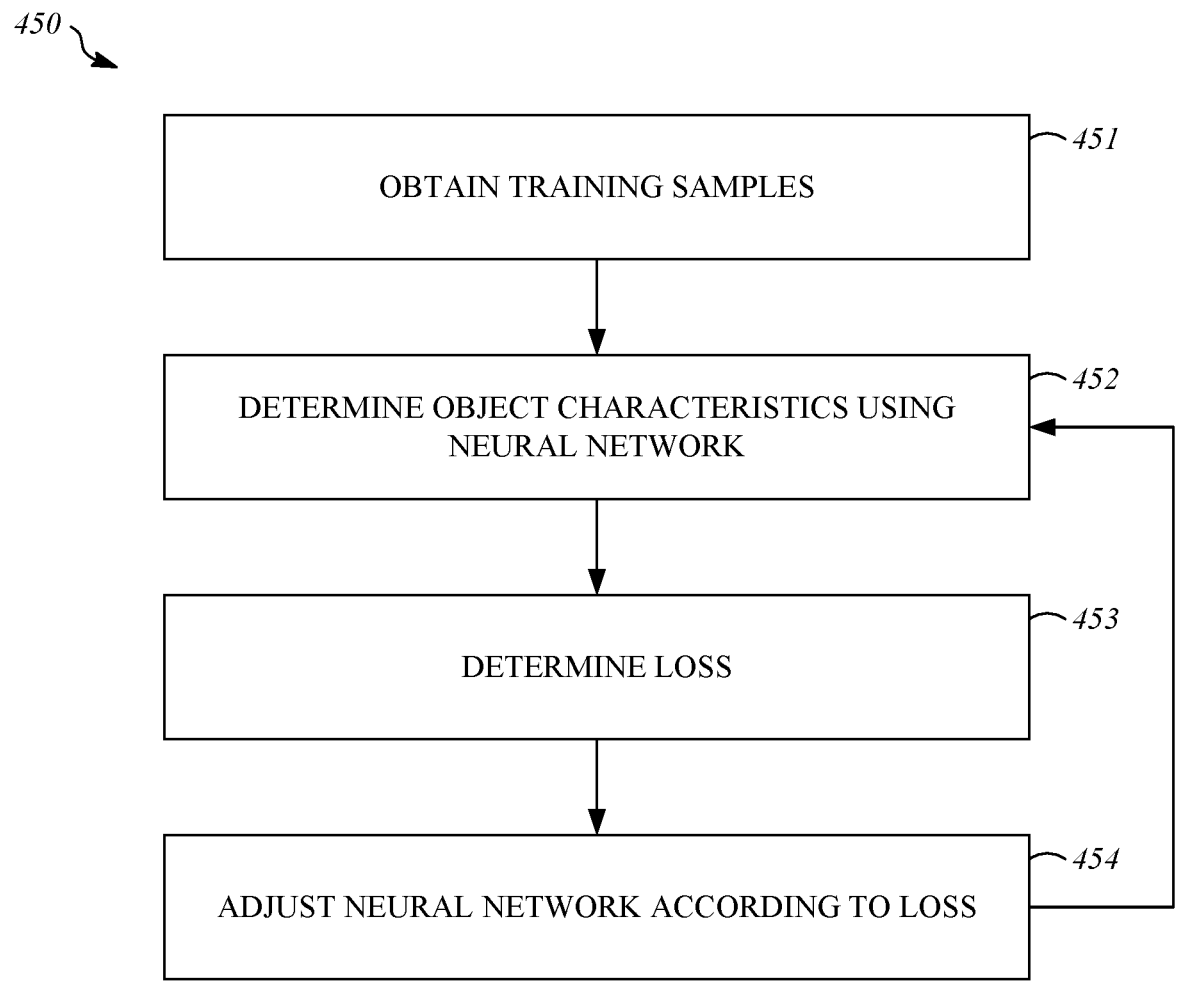
FIG. 4 is flowchart that shows an example of a process for training an image analyzer.

FIG. 4 is flowchart that shows an example of a process 450 for training the image analyzer 320. The process 450 can be used to configure the image analyzer 320. The process 450 can be executed using a computing device such as one or more processors that execute instructions that are stored in memory. The instructions cause performance of the process 450 by the computing device. Alternatively, the process 450 can be implemented directly in hardware, firmware, or software, circuitry, or a combination thereof.

In operation 451, training samples are obtained. The training samples are inputs that are used to train a machine learning model (e.g., a deep neural network) that is used to implement the image analyzer 320.

The training samples include images that depict objects. The training samples also include annotations that are associated with the images. The annotations are ground truth information describing presence of the objects in the images and characteristics of the objects. In the description herein, information that is described by the ground truth information may be described using the adjective "annotated" in order to distinguish from estimates by an automated system such as the image analyzer 320.

The annotations may include bounding boxes that each indicate an area in an image where an object is present. As an example, the bounding boxes may each be a two-dimensional figure such as a rectangle. The annotations may also include a classification for each of the bounding boxes. The classification identifies the type of object that is depicted in the image within the area indicated by the respective bounding box and may be a text label. Examples of classifications may include "car," "truck," "bus," and "person." The annotations may also include key point locations that describe that location relative to the image where discrete, predetermined features of the object are located. The key point locations may be expressed as two-dimensional coordinates relative to the image (e.g., an x-coordinate and a y-coordinate).

As used herein, the term "obtained" includes any action by which the training samples are made available for use, for example, by a computing device that includes a processor. As one example, the training samples can be obtained when they are accessed by a storage device.

In operations 452, 453, and 454, a machine learning model, such as a neural network, is trained for use by the image analyzer 320. As will be explained herein, the machine learning model is trained to determine estimated key point locations for the objects that are depicted in the images as well as key point uncertainty values for each of the key points. The estimated key point locations may be expressed as two-dimensional coordinates relative to the image, in the same manner as the annotated key point locations from the ground truth information are described.

The key point uncertainty values represent accuracy levels associated with each of the estimated key point locations. The key point uncertainty values may describe uncertainty with respect to a first spatial direction relative to the images and with respect to a second spatial direction relative to the images for each of the estimated key point locations. Each of the key point uncertainty values may include a first standard deviation value for the first spatial direction of the images and a second standard deviation value for the second spatial direction of the images. The machine learning models learns to determine the key point uncertainty values without explicit ground truth information. For example, the machine learning models may learn an association between the quality with which a feature is depicted in the image and the resulting difference between the estimated key point location and the annotated key point location.

In the implementations described herein, the machine learning model is also trained to estimate object locations using bounding boxes and object classifications. The bounding boxes and classifications may be useful to key point determination, in that the presence and location of key points will be dependent on the presence and location of objects the classifications of the objects. It should be understood, however, that key point estimation could be implemented separate from or in the absence of bounding box estimation and classification estimation.

In operation 452 object characteristics are estimated by the neural network. The estimated object characteristics may include an estimated bounding box location, an estimated bounding box classification, estimated key point locations for a key point that represents a feature of the object from the bounding box, and key point uncertainty values for each of the key points.

In operation 453, a total loss is determined based in part on a key point localization loss and weighted by the key point uncertainty values. In the implementation described herein, the total loss is also based on bounding box localization loss and the bounding box classification loss. As an example, the total loss can be determined in the manner described with respect to Equations 1-3.

The bounding box localization loss is based on a difference between the annotated bounding box locations, according to the annotations from the training samples, and the estimated bounding box locations from operation 452. The bounding box classification loss is based on a difference between the annotated bounding box classification, according to the annotations from the training samples, and the estimated bounding box classification from operation 452. The key point localization loss is based on a difference between the annotated key point locations, according to the annotations from the training samples, and the estimated key point locations from operation 452.

In operation 454, the neural network is adjusted (e.g., by updating weights) according to the total loss determined in operation 453, in order to minimize the total loss. Subsequent to adjustment of the neural network, the process may return to operation 452, so that additional iterations of operations 452-454 can be performed, until training is finished (e.g., upon convergence).

Figure 5:
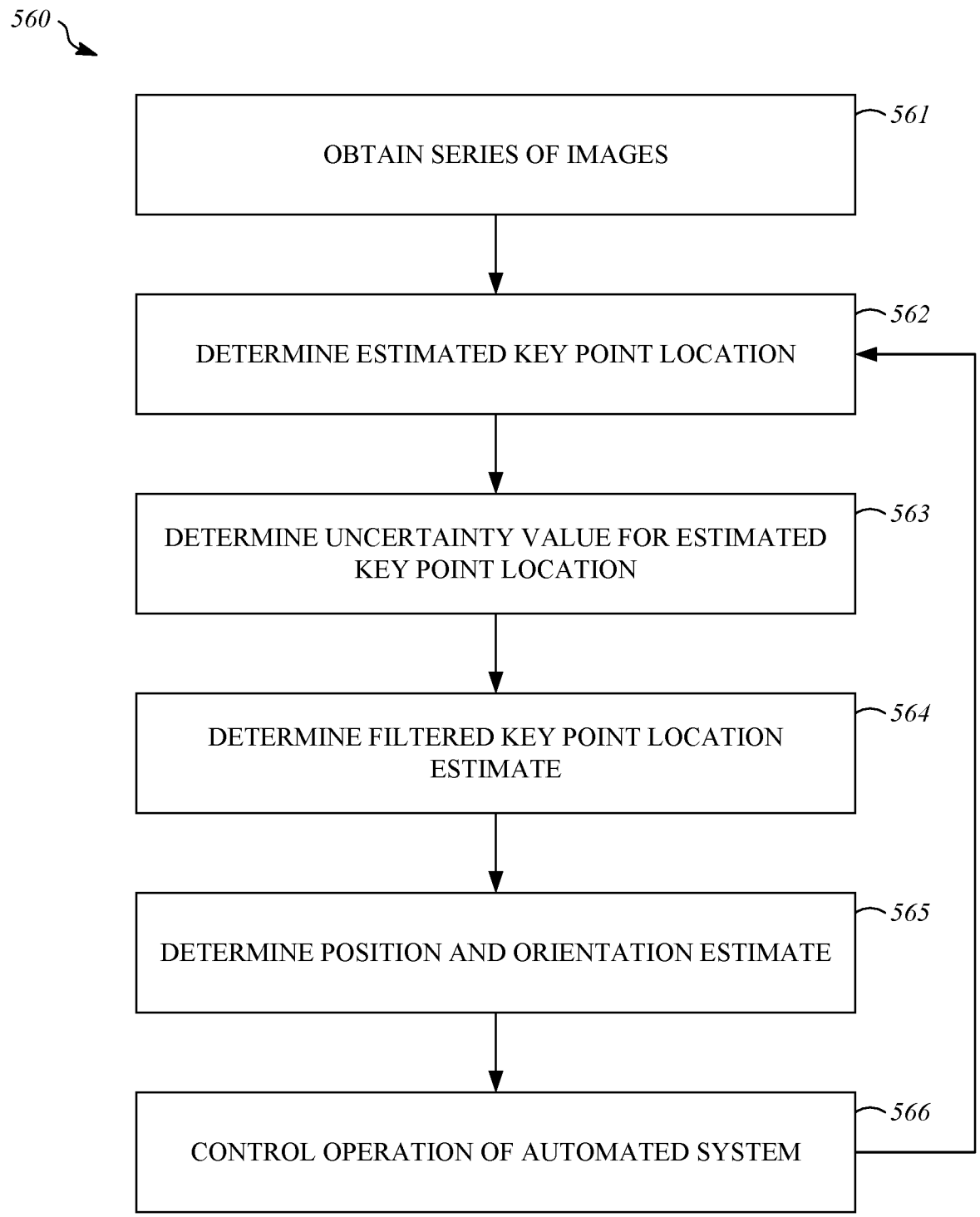
FIG. 5 is flowchart that shows an example of a process for object tracking.

FIG. 5 is flowchart that shows an example of a process 560 for object tracking. The process 560 implements the object tracking described with respect to the object tracking system 210. The process 560 can be executed using a computing device such as one or more processors that execute instructions that are stored in memory. The instructions cause performance of the process 560 by the computing device. Alternatively, the process 560 can be implemented directly in hardware, firmware, or software, circuitry, or a combination thereof.

In the process 560, key point locations are estimated for each image from a series of images. The images represent observations that are taken at multiple time steps. An uncertainty value is determined for each of the key point location estimates, and the key point locations and uncertainty values determined based on each image are used to update a position estimate and an orientation estimate.

Operation 561 includes obtaining a series of images that depict an object having a key point that represents a predetermined feature on the object. The images can be obtained, for example, from a sensor that is configured to obtain the series of images. The series of images can be obtained in the manner described with respect to the sensor information 104 and the sensors 212. As an example, the images can be still images or video frames that are obtained by a still-image camera or a video camera.

In operation 561, key point locations and uncertainty values are estimated for an object. The estimated key point locations represent locations of predetermined features of the object, as previously described. The uncertainty values represent the accuracy of the estimated key point locations, as previously described, such as by describing a distance by which the estimated key point locations may vary from the annotated key point locations.

Operations 562-565 process each image from the series of images to determine estimated key point locations, to determine uncertainty values, and to update the position estimate. Each iteration of these operations can process a different image, such as by selecting the next image in a time-based series of images. In a real-time application, images may be processed as they are obtained to maintain a real-time estimate of the position and orientation of the object. For example, in a real-time application, operation 561 may include adding newly obtained images to a buffer, and each iteration of operations 562-565 may include processing the most recently added image.

Operation 562 includes determining, based on the image, an estimated key point location. The key point corresponds to a predetermined feature on the object. The estimated key point location may be expressed as two-dimensional coordinates (e.g., an x-coordinate and a y-coordinate) relative to the image. Operation 563 includes determining, based on the image, an uncertainty value that represents accuracy of the estimated key point location. The key point uncertainty value may describe uncertainty with respect to a first spatial direction relative to the images and with respect to a second spatial direction relative to the image. The key point uncertainty values may include a first standard deviation value for the first spatial direction of the image and a second standard deviation value for the second spatial direction of the image. Determining the estimated key point location in operation 562 and determining the uncertainty value in operation 563 may be performed using a trained machine learning model that is trained by minimizing a loss function that is based on a key point localization loss value that is weighted based on uncertainty, as described with respect to the image analyzer and the process 450.

Operation 564 includes updating a filtered key point location estimate based on the estimated key point location and the uncertainty value. Operation 564 can be performed by filtering a series of recently-determined key point location estimates based on their respective uncertainty values (i.e., according to input-dependent variance). In operation 565, a position and orientation estimate are made at each time step using the filtered key point location estimates. Alternatively, unfiltered key point estimates may be used, at each time step, as a basis for determining a position and orientation estimate and filtering is applied to update a filtered position and orientation estimates according to uncertainty values associated with the key point location estimates and optionally using uncertainty measurements for other inputs to the position and orientation estimates. As an example, filtering may be performed using a fixed-lag smoother.

Operation 566 includes controlling operation of an automated system based in part on the filtered key point location estimate. As an example, using the position and pose estimates from operation 565, which are determined based in part on the filtered key point location estimate, the automated system can be controlled to proceed toward a destination while avoiding objects, which can be implemented in the manner described with respect to the automated controller 208, or in any other suitable manner.

Figure 6:
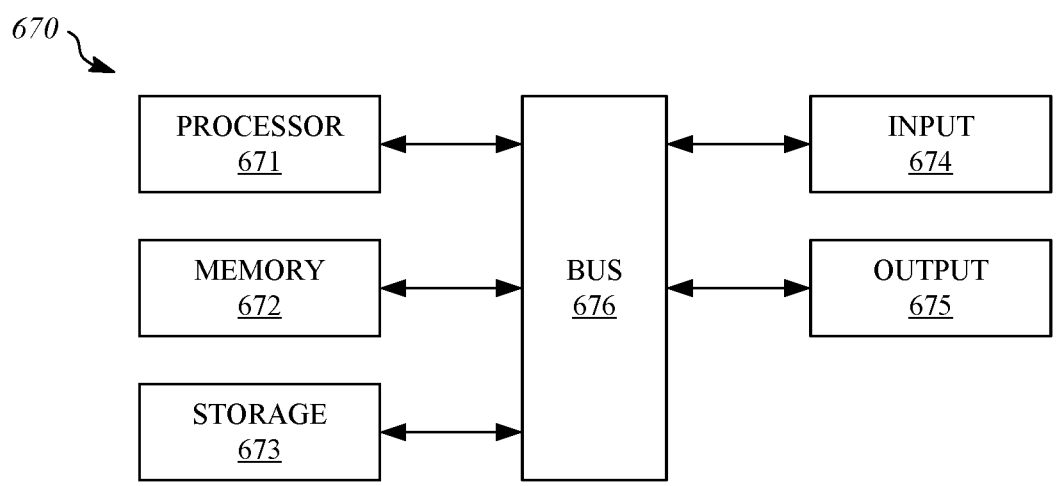
FIG. 6 is an illustration that shows an example of a hardware configuration for a computing device.

FIG. 6 is an illustration that shows an example of a hardware configuration for a computing device that can be used to implement computing devices described herein, including computing devices that may be used to implement a system for object recognition and tracking using key point locations and uncertainty values. The computing device 670 may include a processor 671, a memory 672, a storage device 673, one or more input devices 674, and one or more output devices 675. The computing device 670 may include a bus 676 or a similar device to interconnect the components for communication. The processor 671 is operable to execute computer program instructions and perform operations described by the computer program instructions. As an example, the processor 671 may be a conventional device such as a central processing unit. The memory 672 may be a volatile, high-speed, short-term information storage device such as a random-access memory device. The storage device 673 may be a non-volatile information storage device such as a hard drive or a solid-state drive. The input devices 674 may include any type of human-machine interface such as buttons, switches, a keyboard, a mouse, a touchscreen input device, a gestural input device, or an audio input device. The output devices 675 may include any type of device operable to provide an indication to a user regarding an operating state, such as a display screen or an audio output.

What is claimed is:

1. A method for training a machine learning model to determine estimated key point locations and uncertainty values in input images, comprising:
    analyzing a training image using the machine learning model to determine an estimated key point location in the training image and an uncertainty value that represents accuracy of the estimated key point location;
    determining, using an annotation that corresponds to the training image and describes an actual key point location, a difference value based on the estimated key point location and the actual key point location;
    determining a weighted difference value by weighting the difference value according to the uncertainty value; and
    updating the machine learning model to minimize a loss function that is based in part on the weighted difference value.

2. The method of claim 1, wherein the actual key point location corresponds to a feature on an object in the training image.

3. The method of claim 1, wherein the actual key point location and the estimated key point location are expressed as two-dimensional coordinates relative to the training image.

4. The method of claim 1, wherein the key point uncertainty value is a metric that describes whether the estimated key point location is believed to be accurate.

5. The method of claim 1, wherein the key point uncertainty values describe uncertainty with respect to a first spatial direction relative to the images and with respect to a second spatial direction relative to the images for each of the estimated key point locations.

6. The method of claim 5, wherein each of the key point uncertainty values include a first standard deviation value for the first spatial direction of the images and a second standard deviation value for the second spatial direction of the images.

7. The method of claim 1, wherein the uncertainty value defines a spatial area around the estimated key point location where the actual key point location is likely to be found in the training image.

8. A method, comprising:
    obtaining an image that depicts an object having a key point;
    determining, based on the image, an estimated key point location for the key point;
    determining, based on the image, an uncertainty value that represents accuracy of the estimated key point location; and
    determining a filtered key point location estimate by updating a previous key point location estimate based on the estimated key point location and the uncertainty value; and
    controlling operation of an automated system based in part on the filtered key point location estimate.

9. The method of claim 8, wherein the key point corresponds to a feature on the object.

10. The method of claim 8, wherein the estimated key point location is expressed as two-dimensional coordinates relative to the image.

11. The method of claim 8, wherein the uncertainty value represents an accuracy level associated with the estimated key point location.

12. The method of claim 8, wherein the uncertainty value describes uncertainty with respect to a first spatial direction relative to the image and with respect to a second spatial direction relative to the image for the estimated key point location.

13. The method of claim 8, wherein controlling operation of an automated system based in part on the filtered key point location estimate includes determining a position and orientation for the object based on the filtered key point location estimate.

14. The method of claim 8, wherein determining the estimated key point location and determining the uncertainty value is performed using a trained machine learning model that is trained by minimizing a loss function that is based on a key point localization loss value that is weighted based on uncertainty.

15. A method, comprising:
    determining, based on an image, an estimated key point location for a key point of an object;
    determining, based on the image, an uncertainty value that represents accuracy of the estimated key point location, wherein the uncertainty value includes a first standard deviation value for the first spatial direction of the image and a second standard deviation value for the second spatial direction of the image; and
    controlling operation of an automated system based in part on the estimated key point location and the uncertainty value.

16. The method of claim 8, further comprising:
    determining a position estimate for the object and an orientation estimate for the object based on the filtered key point location estimate.

17. A system, comprising:
    a sensor that is configured to obtain a series of images that depict an object having a key point;
    an image analyzer that is configured to determine, for image from the series of images, an estimated key point location for the key point, and an uncertainty value that represents accuracy of the estimated key point location; and
    an object tracker that is configured to determine a filtered key point location estimate by updating a previous key point location estimate based on the estimated key point location and the uncertainty value and determine a position estimate for the object and an orientation estimate for the object based on the filtered key point location estimate.

18. The system of claim 17, wherein the key point corresponds to a feature on the object.

19. The system of claim 17, wherein the estimated key point location is expressed as two-dimensional coordinates relative to the image.

20. The system of claim 17, wherein the uncertainty value represents an accuracy level associated with the estimated key point location.

21. The system of claim 17, wherein the uncertainty value describes uncertainty with respect to a first spatial direction relative to the image and with respect to a second spatial direction relative to the image for the estimated key point location.

22. The system of claim 17, wherein the image analyzer includes a trained machine learning model that is trained by minimizing a loss function that is based on a key point localization loss value that is weighted based on uncertainty.

23. The system of claim 17, wherein the uncertainty value defines a spatial area around the estimated key point location where the actual key point location is likely to be found in the image from the series of images.

24. A system, comprising:
    a sensor that is configured to obtain an image that depicts an object having a key point; and
    an image analyzer that is configured to determine, using the image, an estimated key point location for the key point, and an uncertainty value that represents accuracy of the estimated key point location, wherein the uncertainty value includes a first standard deviation value for the first spatial direction of the image and a second standard deviation value for the second spatial direction of the image.

25. The method of claim 8, wherein the uncertainty value defines a spatial area around the estimated key point location where the key point of the object is likely to be found in the image.

* * * * *

UNITED STATES PATENT AND TRADEMARK OFFICE
CERTIFICATE OF CORRECTION

| | | |
|---|---|---|
| PATENT NO. | : 11,080,562 B1 | Page 1 of 1 |
| APPLICATION NO. | : 16/441167 | |
| DATED | : August 3, 2021 | |
| INVENTOR(S) | : Shreyas Saxena et al. | |

It is certified that error appears in the above-identified patent and that said Letters Patent is hereby corrected as shown below:

In the Claims

Column 12, Claim 8, Line 59, "and determining a filtered" should be --determining a filtered--.

Signed and Sealed this
Ninth Day of November, 2021

Drew Hirshfeld
*Performing the Functions and Duties of the*
*Under Secretary of Commerce for Intellectual Property and*
*Director of the United States Patent and Trademark Office*